(12) United States Patent
Bacher et al.

(10) Patent No.: US 7,309,746 B2
(45) Date of Patent: Dec. 18, 2007

(54) POLYMERS CONTAINING SILANE

(75) Inventors: Andreas Bacher, Burghausen (DE);
Kurt Stark, Burgkirchen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 246 days.

(21) Appl. No.: 10/513,242

(22) PCT Filed: Jul. 17, 2003

(86) PCT No.: PCT/EP03/07791

§ 371 (c)(1),
(2), (4) Date: Nov. 2, 2004

(87) PCT Pub. No.: WO2004/013187

PCT Pub. Date: Feb. 12, 2004

(65) Prior Publication Data

US 2005/0182223 A1   Aug. 18, 2005

(30) Foreign Application Priority Data

Jul. 25, 2002  (DE) .............................. 102 33 936

(51) Int. Cl.
*C08F 2/38* (2006.01)
(52) U.S. Cl. ........................................ 526/89; 526/279
(58) Field of Classification Search ................ 526/279, 526/89
See application file for complete search history.

(56) References Cited

U.S. PATENT DOCUMENTS

| | | | |
|---|---|---|---|
| 3,078,293 A | 2/1963 | Ender et al. | |
| 4,187,363 A * | 2/1980 | Marshall et al. | 526/208 |
| 4,424,392 A * | 1/1984 | Petty | 556/436 |
| 4,476,172 A | 10/1984 | Ward | |
| 5,036,137 A | 7/1991 | Sau | |
| 5,532,329 A | 7/1996 | Filges et al. | |
| 5,789,516 A * | 8/1998 | Graiver et al. | 528/19 |
| 6,221,994 B1 | 4/2001 | Galbiati et al. | |
| 6,337,370 B1 | 1/2002 | Bae et al. | |
| 6,346,570 B1 | 2/2002 | Kazuyuki et al. | |

FOREIGN PATENT DOCUMENTS

| | | |
|---|---|---|
| DE | 1 919 609 | 11/1969 |
| DE | 26 55 877 | 6/1978 |
| DE | 41 05 601 | 8/1992 |
| EP | 0 123 927 | 11/1984 |
| EP | 0 217 178 | 4/1987 |
| EP | 0 392 948 | 10/1990 |
| EP | 0 581 576 | 2/1994 |
| EP | 0 656 370 | 6/1995 |
| GB | 1 407 827 | 9/1975 |
| JP | 1224380 | 9/1989 |
| JP | 1247410 | 10/1989 |
| WO | WO 01/09249 | 2/2001 |

OTHER PUBLICATIONS

Graiver et al., "Block Copolymer Containing Silicone and Vinyl Polymer Segments by Free Radical Polymerization", ACS Symp. Ser. (2000) 729, 445-459.*
Derwent Abstract corresponding to DE 41 05 601 A1, Aug. 27, 1992.
Derwent Abstract corresponding to EP 0 392 948 A1, Oct. 17, 1990.
Derwent Abstract corresponding to DE 26 55 877 A1, Jun. 15, 1978.
Derwent Abstract corresponding to DE 1 919 609, Nov. 6, 1969.
Derwent Abstract corresponding to JP 1-247410, Oct. 3, 1989.
Derwent Abstract corresponding to JP 1-224380, Sep. 7, 1989.

* cited by examiner

*Primary Examiner*—Kuo-Liang Peng
(74) *Attorney, Agent, or Firm*—Brooks Kushman P.C.

(57) ABSTRACT

Silane-containing polymers are prepared by the polymerization of one or more ethylenically unsaturated monomers in the presence of a silane-containing aldehyde, hemiacetal, or acetal as a regulator, optionally with further regulators as well. The silane-containing regulators produce polymers with superior properties and with improved polymerization parameters as compared to the conventional mercaptosilane regulators.

18 Claims, No Drawings

POLYMERS CONTAINING SILANE

BACKGROUND OF THE INVENTION

1. Field of the Invention

The invention relates to silane-containing polymers, to processes for preparing silane-containing polymers in the presence of silane-containing molecular weight regulators, and to their use.

2. Description of the Related Art

The prior art has disclosed a number of processes for preparing silane-containing polymers. Their preparation can take place, for example, by means of polymer-analogous reaction of functional polymers with silylating agents. U.S. Pat. No. 5,036,137, for example, describes the preparation of silylated polyvinyl alcohol, polyvinyl alcohol being reacted with 3-glycidyloxypropyltrimethoxysilane or vinyltrimethoxy silane. EP-A 581576 discloses reacting OH-functional polymers such as polyvinyl alcohol with alkyl orthosilicates or alkyl-trialkoxysilanes.

Silane-containing polymers can also be prepared by copolymerization of silane-functional ethylenically unsaturated monomers. GB-A 1407827 describes the preparation of vinyl-silanol copolymer dispersions by copolymerizing vinyltrialkoxysilanes with ethylenically unsaturated comonomers. EP-A 123927 relates to silyl-modified polyvinyl alcohols obtainable by methods which include copolymerizing vinyl esters with silyl-functional comonomers, followed by hydrolysis.

Another route is the introduction of silane groups into the polymer by terminating the polymer chain with thio compounds containing Si groups, examples being mercaptosilanes, as is described in U.S. Pat. No. 6,346,570 and in DE-A 4105601; or by terminating by means of Michael addition of functional silanes, as known from U.S. Pat. No. 6,221,994. WO-A 01/09249 discloses preparing silane-functional copolymers by copolymerization with vinyl-silane and termination of the polymer chain with mercaptosilane. Disadvantages associated with the termination of polymer chains with mercaptosilanes are their toxicity and their tendency to undergo addition to double bonds. These mercaptosilanes also have too great a tendency to regulate the molecular weight, leading to excessively sharp reduction of the molecular weight. Moreover, the reaction rate is frequently retarded. Other disadvantages associated with the use of mercaptosilanes include their tendency toward yellowing and their unpleasant odor.

SUMMARY OF THE INVENTION

The object, consequently, was to provide silane-containing polymers without the disadvantages just recited.

An object of the invention, consequently, was to provide silane-containing polymers without the disadvantages just recited. The invention accordingly provides silane-containing polymers obtainable by free-radical addition polymerization of one or more ethylenically unsaturated monomers in the presence of silane-containing aldehydes or their hemiacetals or full acetals.

DETAILED DESCRIPTION OF THE PREFERRED EMBODIMENTS

Suitable silane-containing aldehydes or their hemiacetals and/or full acetals may be indicated by the following structural formulae I to VI:

$$R_3Si\text{—}[OSiR_2]_y\text{—}(CH_2)_x\text{—}CH\text{=}O \text{(aldehyde)}, \quad \text{I)}$$

$$R_3Si\text{—}[OSiR_2]_y\text{—}(CH_2)_x\text{—}CH(OR^1)_2 \text{((hemi)acetal)}, \quad \text{II)}$$

$$R_3Si\text{—}[OSiR_2]_y\text{—}(CH_2)_z\text{—}Ar\text{—}(CH_2)_z\text{—}CH\text{=}O \text{ (aldehyde)}, \quad \text{III)}$$

$$R_3Si\text{—}[OSiR_2]_y\text{—}(CH_2)_z\text{—}Ar\text{—}(CH_2)_z\text{—}CH(OR^1)_2 \text{ ((hemi)acetal)}, \quad \text{IV)}$$

$$O\text{=}CH\text{—}(CH_2)_x\text{—}Si(R)_2\text{—}O\text{—}Si(R)_2\text{—}(CH_2)_x\text{—}CH\text{=}O \text{(aldehyde dimers)}, \quad \text{V)}$$

$$[SiO(R)\text{—}(CH_2)_z\text{—}CH\text{=}O]_{3\text{–}4} \text{(cyclic trimers and tetramers)}, \quad \text{VI)}$$

where R is identical or different at each occurrence and is halogen, preferably Cl or Br; is an unbranched or branched, saturated or unsaturated, optionally substituted alkyl or alkoxy radical having 1 to 12 carbon atoms, preferably having 1 to 3 carbon atoms; is an acyl radical having 2 to 12 carbon atoms, it being possible for R if desired to be interrupted by heteroatoms from the group consisting of N, O and S; or is an optionally substituted aryl or aryloxy radical having 3 to 20 carbon atoms, it also being possible for the aromatic moiety to contain one or more heteroatoms from the group consisting of N, O and S. With preference one radical R can be hydrolyzed in order to form a free silanol group Si-OH.

$R^1$ is an unbranched or branched, saturated or unsaturated, optionally substituted alkyl radical having 1 to 12 carbon atoms, preferably 1 to 3 carbon atoms, which may be interrupted if desired by heteroatoms from the group consisting of N, O and S. $R^1$ can alternatively be H, in which case a hemiacetal is present when one radical $R^1$ is H or an aldehyde hydrate is present when both radicals $R^1$ are H. Ar is an aromatic group, preferably phenylene, including aromatics containing one or more heteroatoms from the group consisting of N, O and S. These aromatics may also be differently substituted.

x is a number from 2 to 40, preferably 2 to 10. y is a number from 0 to 100, preferably a number from 0 to 10. z is a number between 0 and 20, preferably 0 to 5.

The silane-containing aldehydes are used in an amount of from 0.0001 to 5.0% by weight, preferably from 0.01 to 4.0% by weight, more preferably from 0.1 to 3.0% by weight, based in each case on the total weight of the monomers.

Preferred silane-containing aldehdyes or their hemiacetals or full acetals are those of structural formulae I and II, particularly those aldehyde derivatives which can be obtained by hydrosilylation from acrolein and/or its hemiacetal or full acetal, examples being 3,3-diethoxypropyltriethoxysilane, 3,3-dimethoxypropyltriethoxysilane, 3,3-diethoxypropyltrimethoxysilane, 3,3-dimethoxypropyltrimethoxysilane, 3,3-dimethoxypropyltrimethoxysilane, 3,3-dimethoxypropyldiisopropoxymethylsilane, 3,3-diethoxypropyldimethylethoxysilane, 3,3-dimethoxypropyldiisopropoxymethylsilane, 3,3-dimethoxypropyltripropoxysilane, 3,3-dimethoxypropyltriisopropoxysilane, 3,3-dipropoxypropyltriethoxysilane, 3,3-diethoxypropylmethyldimethoxysilane, 3,3-diethoxypropyldimethylmethoxysilane, 3,3-dimethoxypropylmethyldimethoxysilane, 3,3-dimethoxypropyldimethylmethoxysilane, 3,3-dimethoxypropylmethyldiethoxysilane, 3-(trimethoxysilyl)propionaldehyde, 3-(triethoxysilyl)propionaldehyde, 3-trimethylsilylpropionaldehyde, and 3-(methyldiethoxy)silylpropionaldehyde. Preference is also given to 4-(trimethoxysilyl)butyraldehyde and also 1,1'-diethylformyltetramethyldisiloxane (dimer according to V). The free aldehyde groups in the case of the hemiacetals and full acetals are liberated by hydrolysis in an aqueous medium.

Suitable ethylenically unsaturated monomers include one or more monomers from the group consisting of vinyl esters of unbranched or branched alkylcarboxylic acids having 1 to 18 carbon atoms, acrylic esters or methacrylic esters of branched or unbranched alcohols or diols having 1 to 18 carbon atoms, ethylenically unsaturated monocarboxylic and dicarboxylic acids, their salts, and also their amides or N-methylolamides and nitriles, ethylenically unsaturated sulfonic acids and their salts, ethylenically unsaturated heterocyclic compounds, alkyl vinyl ethers, dienes, olefins, vinylaromatics and vinyl halides.

Suitable vinyl esters are those of carboxylic acids having 1 to 13 carbon atoms. Preference is given to vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 13 carbon atoms, such as VeoVa9$^R$ or VeoVa10$^R$ (trade names of Resolution Performance Products). Vinyl acetate is particularly preferred.

Suitable monomers from the acrylic ester or methacrylic ester group are esters of unbranched or branched alcohols or diols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate, benzyl (meth)acrylate, 2-hydroxyethyl (meth)acrylate, hydroxypropyl (meth)acrylate, n-hexyl (meth)acrylate, isooctyl (meth)acrylate, isodecyl (meth)acrylate, lauryl (meth)acrylate, methoxyethyl (meth)acrylate, phenoxyethyl (meth)acrylate, isobornyl (meth)acrylate, stearyl (meth)acrylate, cyclohexyl (meth)acrylate, α-chloroacrylic esters, and α-cyanoacrylic esters. Particular preference is given to methyl acrylate, methyl methacrylate, n-butyl acrylate, t-butyl acrylate and 2-ethylhexyl acrylate.

Examples of suitable ethylenically unsaturated monocarboxylic and dicarboxylic acids, their salts and also their amides or N-methylolamides and nitriles are acrylic acid, methacrylic acid, fumaric acid, maleic acid, acrylamide, N-methylolacrylamide, N-methylolmethacrylamide, and acrylonitrile and methacrylonitrile. Examples of ethylenically unsaturated sulfonic acids are vinylsulfonic acid and 2-acrylamido-2-methylpropanesulfonic acid. Suitable ethylenically unsaturated heterocyclic compounds are vinylpyrrolidone, vinylpyridine, N-vinylimidazole and N-vinylcaprolactam.

Preferred vinylaromatics are styrene, α-methylstyrene and vinyltoluene. Preferred vinyl halides are vinyl chloride, vinylidene chloride and vinyl fluoride. The preferred olefins are ethylene and propylene and the preferred dienes are 1,3-butadiene and isoprene.

Preferred alkyl vinyl ethers are ethyl vinyl ether, n-butyl vinyl ether, isobutyl vinyl ether, tert-butyl vinyl ether, cyclohexyl vinyl ether, octadecyl vinyl ether, hydroxybutyl vinyl ether and cyclohexanedimethanol monovinyl ether. Other suitable ethylenically unsaturated monomers are vinyl methyl ketone, N-vinylformamide, N-vinyl-N-methylacetamide, vinyl-carbazole and vinylidene cyanide.

In order to increase the degree of silanization it is also possible additionally to copolymerize ethylenically unsaturated, silane-containing monomers. Suitable ethylenically unsaturated, silane-containing monomers are, for example, ethylenically unsaturated silicon compounds of the general formula $R^2SiR^3{}_{0-2}(OR^4)_{1-3}$, where $R^2$ has the definition $CH_2=CR^5-(CH_2)_{0-1}$ or $CH_2=CR^5CO_2(CH_2)_{1-3}$, $R^3$ has the definition $C_1$ to $C_3$ alkoxy radical or halogen, preferably Cl or Br, $R^4$ is an unbranched or branched, optionally substituted alkyl radical having 1 to 12 carbon atoms, preferably 1 to 3 carbon atoms, or is an acyl radical having 2 to 12 carbon atoms, it being possible for $R^4$ if desired to be interrupted by an ether group, and $R^5$ is H or $CH_3$. The ethylenically unsaturated, silane-containing monomers are preferably copolymerized in an amount of from 0.01 to 10.0% by weight, more preferably from 0.01 to 1.0% by weight, based in each case on the total weight of the comonomers.

Preferred ethylenically unsaturated, silane-containing monomers are γ-acryloyl- and γ-methacryloyloxypropyl-tri(alkoxy)silanes, α-methacryloyloxymethyl-tri(alkoxy)silanes, γ-methacryloyloxypropylmethyl-di(alkoxy)silanes, or vinylsilanes such as vinylalkyl-di(alkoxy)silanes and vinyltri(alkoxy)silanes, the alkoxy groups which can be used being, for example, methoxy, ethoxy, methoxyethylene, ethoxyethylene, methoxypropylene glycol ether and/or ethoxypropylene glycol ether radicals. Examples of preferred silane-containing monomers are 3-methacryloyloxypropyltrimethoxysilane, 3-methacryloyloxypropylmethyldimethoxysilane, vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, methacryloyloxymethyltrimethoxysilane, 3-methacryloyloxypropyltris(2-methoxyethoxy)silane, vinyltrichlorosilane, vinylmethyl-dichlorosilane, vinyltris(2-methoxyethoxy)silane, triacetoxyvinylsilane, allylvinyltrimethoxysilane, allyltriacetoxysilane, vinyldimethylmethoxysilane, vinyldimethylethoxysilane, vinylmethyldiacetyloxysilane, vinyldimethylacetyloxysilane, vinylisobutyldimethoxysilane, vinyltriisopropyloxysilane, vinyltributoxysilane, vinyltrihexyloxysilane, vinylmethoxydihexoxysilane, vinyltrioctyloxysilane, vinyldimethoxyoctyloxysilane, vinylmethoxydioctyloxysilane, vinylmethoxydilauryloxysilane, vinyldimethoxylauryloxysilane, and also polyethylene glycol-modified vinylsilanes.

Greatest preference as silanes is given to vinyltrimethoxysilane, vinylmethyldimethoxysilane, vinyltriethoxysilane, vinylmethyldiethoxysilane, vinyltris(1-methoxy)isopropoxysilane, methacryloyloxypropyltris(2-methoxyethoxy)silane, 3-methacryloyloxypropyltrimethoxysilane, 3-methacryloyloxypropylmethyldimethoxysilane and methacryloyloxymethyltrimethoxysilane, and mixtures thereof.

Suitable ethylenically unsaturated, silane-containing onomers are also (meth)acrylamides containing silane groups, of the general formula $CH_2=CR^6-CO-NR^7-R^8-SiR^9{}_n-(R^{10})_{3-m}$, where n=0 to 4, m=0 to 2, $R^6$ is either H or a methyl group, $R^7$ is H or an alkyl group having 1 to 5 carbon atoms; $R^8$ is an alkylene group having 1 to 5 carbon atoms or a bivalent organic group in which the carbon chain is interrupted by an oxygen or nitrogen atom, $R^9$ is an alkyl group having 1 to 5 carbon atoms and $R^{10}$ is an alkoxy group having 1 to 40 carbon atoms which can be substituted by further heterocycles. In monomers where there are two or more $R^6$ or $R^{10}$ groups these groups can be identical or different. The (meth)acrylamidoalkylsilanes are also preferably copolymerized in an amount of from 0.01 to 10% by weight, more preferably from 0.01 to 1.0% by weight, based in each case on the total weight of the comonomers.

Examples of such (meth)acrylamidoalkylsilanes are: 3-(meth)acrylamidopropyltrimethoxysilanes, 3-(meth)acrylamidopropyltriethoxysilanes, 3-(meth)acrylamidopropyltri(β-methoxyethoxy)silanes, 2-(meth)acrylamido-2-methyl-propyltrimethoxysilanes, 2-(meth)acrylamido-2-methylethyltrimethoxysilanes, N-(2-(meth)acrylamidoethyl)aminopropyltrimethoxysilanes, 3-(meth)acrylamidopropyltriacetoxysilanes, 2-(meth)acrylamidoethyltrimethoxysilanes, 1-(meth)acrylamidomethyltrimethoxysilanes, 3-(meth)acrylamidopropylmethyldimethoxysilanes, 3-(meth)acrylamidopropyldimethylmethoxysilanes, 3-(N-methyl-(meth)acrylamido)propyltrimethoxysilanes, 3-((meth)acrylamidomethoxy)-3-hydroxypropyltrimethoxysilanes, 3-((meth)acrylamidomethoxy)propyltrimethoxysilanes, N,N-dimethyl-N-trimethoxysilylpropyl-3-(meth)acrylamidopropylammonium chloride and N,N-di-methyl-N-trimethoxysilylpropyl-2-(meth)acrylamido-2-methylpropylammonium chloride.

Particular preference is given to monomers or mixtures containing one or more monomers from the group consisting of vinyl acetate, vinyl esters of α-branched monocarboxylic acids having 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene. Greatest preference is given to mixtures of vinyl acetate with ethylene; of vinyl acetate, ethylene and a vinyl ester of α-branched monocarboxylic acids having 9 to 11 carbon atoms; of n-butyl acrylate with 2-ethylhexyl acrylate and/or methyl methacrylate; of styrene with one or more monomers from the group consisting of methyl acrylate, ethyl acrylate, propyl acrylate, n-butyl acrylate and 2-ethylhexyl acrylate; of vinyl acetate with one or more monomers from the group consisting of methyl acrylate, ethyl acrylate, propyl acrylate, n-butyl acrylate, 2-ethylhexyl acrylate and, if desired, ethylene; these mixtures may if desired also contain one or more of the abovementioned ethylenically unsaturated, silane-containing monomers.

The monomer selection and/or the selection of the weight fractions of the comonomers are/is made such that in general the resulting glass transition temperature Tg is from −50° C. to +120° C., preferably from −30° C. to +95° C. The glass transition temperature Tg of the polymers can be determined in conventional manner by means of differential scanning calorimetry (DSC). The Tg can also be calculated approximately in advance by means of the Fox equation. According to Fox T. G., Bull. Am. Physics Soc. 1, 3, page 123 (1956) it is the case that:

$1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature, in kelvins, of the homopolymer of the monomer n. Tg values for homopolymers are listed in Polymer Handbook, 2nd Edition, J. Wiley & Sons, New York (1975).

The free-radically initiated addition polymerization of the ethylenically unsaturated monomers may in principle take place by any of the polymerization techniques known for the purpose, such as bulk polymerization, solution polymerization, precipitation polymerization, suspension polymerization in water, and emulsion polymerization in water.

The polymerization temperature is generally 40° C. to 100° C., preferably 60° C. to 90° C. When copolymerizing gaseous comonomers such as ethylene, 1,3-butadiene or vinyl chloride it is also possible to operate under pressure, generally at between 2 bar and 100 bar. The polymerization can be initiated with the customary water-soluble or monomer-soluble initiators or with redox initiator combinations. Examples of water-soluble initiators are the sodium, potassium and ammonium salts of peroxodisulfuric acid, hydrogen peroxide, t-butyl peroxide, potassium peroxodiphosphate, t-butyl peroxopivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, dibenzoyl peroxide, t-butyl perneodecanoate, t-butyl per-2-ethylhexanoate and t-butyl perpivalate.

The stated initiators are used generally in an amount of from 0.01 to 10.0% by weight, preferably from 0.1 to 0.5% by weight, based in each case on the total weight of the monomers. As redox initiators use is made of combinations of the stated initiators with reducing agents. Suitable reducing agents are the sulfites and bisulfites of the alkali metals and of ammonium, such as sodium sulfite, the derivatives of sulfoxylic acid such as zinc or alkali metal formaldehyde sulfoxylates, such as sodium hydroxymethanesulfinate, and ascorbic acid. The amount of reducing agent is generally from 0.01 to 10.0% by weight, preferably from 0.1 to 0.5% by weight, based in each case on the total weight of the monomers.

Solution polymerization is carried out using organic solvents such as, for example, tetrahydrofuran, diethyl ether, petroleum ether, methyl acetate, ethyl acetate, methyl ethyl ketone, acetone, isopropanol, propanol, ethanol, methanol, toluene or benzene.

In the case of the stated techniques of suspension and emulsion polymerization, polymerization is conducted in the presence of surface-active substances such as protective colloids and/or emulsifiers. Examples of suitable protective colloids include partly hydrolyzed polyvinyl alcohols, polyvinylpyrrolidones, polyvinylacetals, starches, celluloses and their carboxymethyl, methyl, hydroxyethyl and hydroxypropyl derivatives. Suitable emulsifiers include not only anionic and cationic but also nonionic emulsifiers, examples being anionic surfactants, such as alkyl sulfates having a chain length of 8 to 18 carbon atoms, alkyl or alkylaryl ether sulfates having 8 to 18 carbon atoms in the hydrophobic radical and up to 60 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having up to 60 ethylene oxide and/or propylene oxide units.

The monomers can be included in toto in the initial charge, metered in toto, or included in fractions in the initial charge, with the remainder being metered in after the polymerization has been initiated. The metered feeds can be made separately (both physically and in time) or the components for metering can be metered all or partly in pre-emulsified form.

The silane-containing aldehydes or their hemiacetals and/or full acetals that are used as regulators can be included in their entirety in the initial charge, can be metered in in their entirety, or can be included in fractions in the initial charge and the remainder metered in. It is preferred to include one portion in the initial charge and to meter in the remainder. Particular preference is given to adding regulators and monomers in such a way that their molar ratio remains constant. This measure produces a homogeneous molecular weight distribution.

Besides the silane-containing aldehydes used as regulators it is also possible to use further regulators based on silane-containing compounds or on aldehydes. Examples of further aldehydic regulators are:

trifluoroacetaldehyde, acetaldehyde, propionaldehyde, glyoxal, 2,2,2-trifluoropropionaldehyde, isobutyraldehyde, chloroacetaldehyde, 2-chloropropionaldehyde, dichloroacetaldehyde, methoxyacetaldehyde, trichloroacetaldehyde, pentanal, butylacetaldehyde, dimethylethylacetaldehyde, ethoxyacetaldehyde, methylisopropylacetaldehyde, 2-bromoisobutyraldehyde, 2-ethylbutyraldehyde, methyl-n-propylacetaldehyde, n-propoxyacetaldehyde, isobutylacetaldehyde, 3-methoxyisobutyraldehyde, 3-chloropropionaldehyde, caproaldehyde, ethylisopropylacetaldehyde, cyclopentylaldehyde, tetrahydrofurfural, 5-methylhexanal, ethylisobutylacetaldehyde, di-n-propylacetaldehyde, hexahydrobenzaldehyde, 2-ethylhexanal-1,2,2,3-trichloro-n-butyraldehyde, 3-fluorobenzaldehyde, 2,2,2-tribromethanal, 4-fluorobenzaldehyde, 2-fluorobenzaldehyde, benzaldehyde, glutaraldehyde, phenylacetaldehyde, salicylaldehyde, 3-tolualdehyde, 2-tolualdehyde, 4-tolualdehyde, capraldehyde, 2-chlorobenzaldehyde, phenoxyacetaldehyde, 3,5-dimethylbenzaldehyde, 3-phenylpropionaldehyde, 2,6-dimethylbenzaldehyde, 3-methoxybenzaldehyde, 3-bromobenzaldehyde, 4-isopropylbenzaldehyde, 3-ethoxybenzaldehyde, 4-methoxybenzaldehyde, 4-ethoxybenzaldehyde, 3, 4-diethoxybenzaldehyde, diphenylacetaldehyde, 7-methyloctanal, methyl-n-hexylacetaldehyde, 2,3-dichloro-n-butyraldehyde, n-octylaldehyde, pelargonaldehyde, undecanal, n-tridecylaldehyde, 2-hydroxypropionaldehyde, 3-phenyl-2-methylpropanal, methyl-n-butylglycolaldehyde, phenoxyacetaldehyde, cyclohexylaldehyde, 2,3,6-trimethylbenzaldehyde, 3,5-dimethylhexahydrobenzaldehyde, methylphenylglycolaldehyde, 2,4,6-trimethylbenzaldehyde, ethylphenylglycolaldehyde, 2-hydroxybutanal, 1,2,3,4-tetrahydro-2-naphthaldehyde, 2-(1-naphthyl) propionaldehyde, adipaldehyde, phenylglyoxal, 4-isopropylbenzaldehyde, 2-phenoxybenzaldehyde, 1-naphthaldehyde, 4-chloro-n-butyraldehyde, 2,3-dichloropropionaldehyde, 4-hydroxybutanal, 2-isopropyl-3-hydroxypropionaldehyde, 3-methyl-3-hydroxybutanal, 2-methyl-4-methoxy-p-butyraldehyde, 2-phenylpropionaldehyde, 3-pyridinealdehyde, 3-chlorobenzaldehyde, 2,3,5,6-tetramethylbenzaldehyde, 2-ethoxybenzaldehyde, tetradecanal, pentadecanal, hexadecanal, phenylacetaldehyde, 4-methoxy-1-naphthaldehyde, heptadecanal, 3,4-methylenedioxybenzaldehyde, 2-iodobenzaldehyde, stearylaldehyde, 2-methoxybenzaldehyde, 2-aminobenzaldehyde, 4-diethylaminobenzaldehyde, dodecanal, 2-nitrobenzaldehyde, 3,4-dimethoxybenzaldehyde, 4-chlorobenzaldehyde, benzylglycolaldehyde, 4-chloro-2-hydroxybenzaldehyde, 4-quinolinealdehyde, 2,3-diphenylpropionaldehyde, 2,3-dimethoxybenzaldehyde, 9-hydroxynonanal, 3-benzyloxybenzaldehyde, phthaldehyde, 4-bromobenzaldehyde, 3-nitrobenzaldehyde, 2-phenanthrenealdehyde, 1-hydroxy-2-naphthaldehyde, 2-naphthaldehyde, 4-phenylbenzaldehyde, 3-methoxy-4-ethoxybenzaldehyde, 5-methoxy-1-naphthaldehyde, 2,6-dichlorobenzaldehyde, 2-quinolenealdehyde, 6-quinolenealdehyde, 3,4,5-trimethoxybenzaldehyde, 4-iodobenzaldehyde, 3-phenanthrenealdehyde, 2-methoxy-1-naphthaldehyde, 2,3,6-trichlorobenzaldehyde, isonaphthaldehyde, hydroxyacetaldehyde, 3-chloro-n-butylaldehyde, 2,3,4-tetrachlorobenzaldehyde, benzaldehyde-2-carboxylic acid, and its esters, 3-hydroxybenzaldehyde, 4-nitrobenzaldehyde, 3,4-dihydroxybenzaldehyde, 3,5-dihydroxybenzaldehyde, 3,5-dichloro-4-hydroxybenzaldehyde, 3,4,5-trihydroxybenzaldehyde, benzaldehyde-4-carboxylic acid, 4-hydroxybenzaldehyde and 2,4,6-trimethoxybenzaldehyde.

After the end of polymerization, residual monomers and volatile components can be removed by means of postpolymerization, distillation, the passing of inert gas and/or steam through the batch, or a combination of these measures. To prepare water-redispersible polymer powders it is possible to carry out conventional spray-drying of the aqueous dispersions obtainable by emulsion and suspension polymerization, following the addition of protective colloids as a spraying aid.

The silane-containing polymers can be employed in the fields of application typical for them.

The solid resins and solutions thereof, obtainable by bulk, solution and suspension polymerization, are suitable for use as release agents and coating materials: for example, for producing abhesive (non-adhesive) coatings in release coating. They are also suitable for coating textile, paper, films, wood and metals, as a protective coating or an antifouling coating, for example. A further field of application is that of architectural preservation, particularly for producing weathering-resistant coatings or sealing materials. They are also suitable for use as modifiers and water repellents and as an additive for cosmetics, such as hairsprays or hair fixatives. Further applications are those in adhesives, as binders in paints and printing inks, and in crosslinkable sealants.

Aqueous dispersions or redispersible dispersion powders can be used, for example, in chemical products for the construction industry, alone or in conjunction with hydraulically setting binders such as cements (Portland, aluminate, trass, slag, magnesia, and phosphate cements), gypsum, waterglass, for producing construction adhesives, especially tile adhesives and exterior insulation and finishing adhesives, renders, filling compounds, trowel-applied flooring compounds, leveling compounds, non-shrink grouts, jointing mortars and paints, and also as binders for coating materials and adhesives or as coating materials and binders for textiles, fibers, wood and paper.

EXAMPLE 1

A 2-liter stirred tank with reflux condenser, metering apparatus, thermostatable jacket and an anchor stirrer was charged with 427.27 g of methanol, 77.12 g of vinyl acetate (VAc), 647.84 mg (2.63 mmol) of 1,1'-di(ethylformyl)tetramethyldisiloxane and 347.76 mg of PPV (tert-butyl perpivalate–75% in aliphatics; half-life=1 h at 74° C.). The tank was heated to 60° C. When gentle reflux was attained the metering of initiator began (4.99 g of PPV and 46.74 g of methanol). For the first hour the initiator was metered in at 6 ml/h. After 1 hour of incipient polymerization the monomer feed then began (390.3 g of VAc and 3.28 g (13.32 mmol) of 1,1'-di(ethylformyl)tetramethyldisiloxane) over a time of 240 minutes (rate: 106 ml/h). At the same time the initiator feed was raised to 12 ml/h. The initiator feed ran at this rate for 240 minutes and ended with the monomer feed. Following the initiator feed the batch ran at temperature for another 120 minutes. After this post-reaction time the tank was heated for distillation, in the course of which fresh methanol was placed in the tank every 30 minutes for 6 h, corresponding to the amount removed by distillation (demonomerization).

Solid resin analyses:
Solids content (SC): 48.27% (methanolic solution); pure solid resin: viscosity (Höppler, 10% in ethyl acetate) 2.33 mPas; acid number AN (methanol) 8.98 mg KOH/g; Mw (from GPC, mobile phase THF; polystyrene standards): 31,000 g/mol; Mn: 12,200 g/mol; dispersity Mw/Mn: 2.54; silicon content: 0.119% (alkaline digestion); Si content from $^1$H NMR: 0.126%

EXAMPLE 2

As Example 1 with the difference that instead of 1,1'-di(ethylformyl)tetramethyldisiloxane 2.075 g (15.95 mmol) of 3-trimethylsilylpropionaldehyde were used. Of this amount, 342.34 mg (2.63 mmol) was used in the initial charge, with 1.733 g (13.32 mmol) in the monomer feed.

Solid resin analyses:
Solids content (SC): 49.32% (methanolic solution); pure solid resin: viscosity (Höppler, 10% in ethyl acetate) 2.65 mPas; acid number AN (methanol) 5.31 mg KOH/g; Mw (from GPC, mobile phase THF; polystyrene standards): 38,000 g/mol; Mn: 14,000 g/mol; dispersity Mw/Mn: 2.71; silicon content: 0.075% (alkaline digestion); Si content from $^1$H NMR: 0.084%

EXAMPLE 3

As Example 1 with the difference that instead of 1,1'-di(ethylformyl)tetramethyldisiloxane 3.033 g (15.95 mmol) of 3-(methyldiethoxy)silylpropionaldehyde were used. Of this amount, 500.0 mg (2.63 mmol) was used in the initial charge, with 2.533 g (13.32 mmol) in the monomer feed.

Solid resin analyses:
Solids content (SC): 48.92% (methanolic solution); pure solid resin: viscosity (Höppler, 10% in ethyl acetate) 2.61 mPas; acid number AN (methanol) 6.02mg KOH/g; Mw (from GPC, mobile phase THF; polystyrene standards): 37,500 g/mol; Mn: 13,700 g/mol; dispersity Mw/Mn: 2.74; silicon content: 0.082% (alkaline digestion); Si content from 1H NMR: 0.087%

COMPARATIVE EXAMPLE 4

As Example 1 with the difference that instead of the silane-containing aldehyde 1,1'-di(ethylformyl)tetramethyldisiloxane 3.127 g (15.94 mmol) of 3-mercaptopropyltrimethoxysilane (Wacker GF 70) were used. Of this amount, 515.5 mg (2.63 mmol) was used in the initial charge, with 2.612 g (13.31 mmol) in the monomer feed.

Solid resin analyses:
Solids content (SC): 49.72% (methanolic solution); pure solid resin: viscosity (Höppler, 10% in ethyl acetate) 2.11 mPas; acid number AN (methanol) 10.09 mg KOHlg; Mw (from GPC, mobile phase THF; polystyrene standards): 26,400 g/mol; Mn: 11,400 g/mol; dispersity Mw/Mn: 2.32; silicon content: 0.081% (alkaline digestion).

EXAMPLE 5

A 2-liter stirred tank with reflux condenser, metering apparatus, thermostatable jacket and an anchor stirrer was charged with 426.87 g of methanol, 77.05 g of vinyl acetate (VAc), 459.51 mg (1.87 mmol) of 1,1'-di(ethylformyl)tetramethyldisiloxane, 315.82 mg of vinyltriethoxysilane (in 97% form) and 347.44 mg of PPV (tert-butyl perpivalate–75% in aliphatics; half-life=1 h at 74° C.). The tank was heated to 60° C. When gentle reflux was attained the metering of initiator began (4.98 g of PPV and 46.70 g of methanol). For the first hour the initiator was metered in at 6 ml/h. After 1 hour of incipient polymerization the monomer feed then began (389.93 g of VAc, 1.61 g of vinyltriethoxysilane and 2.345 g (9.53 mmol) of 1,1'-diethylformyl)tetramethyldisiloxane over a time of 240 minutes (rate: 106 ml/h). At the same time the initiator feed was raised to 12 ml/h. The initiator feed ran at this rate for 240 minutes and ended with the monomer feed. Following the initiator feed the batch ran at temperature for another 120 minutes. After this post-reaction time the tank was heated for distillation, in the course of which fresh methanol was placed in the tank every 30 minutes for 6 h, corresponding to the amount removed by distillation (demonomerization).

Solid resin analyses:
Solids content (SC): 50.70% (methanolic solution); pure solid resin: viscosity (Höppler, 10% in ethyl acetate) 2.48 mPas; acid number AN (methanol) 6.73 mg KOH/g; Mw (from GPC, mobile phase THF; polystyrene standards): 36,500 g/mol; Mn: 15,500 g/mol; dispersity Mw/Mn: 2.35; silicon content: 0.153% (alkaline digestion); Si content from $^1$H NMR: 0.162%

COMPARATIVE EXAMPLE 6

As Example 5 with the difference that instead of the silane-containing aldehyde 1,1'-di(ethylformyl)tetramethyldisiloxane 2.238 g (11.41 mmol) of 3-mercaptopropyltrimethoxysilane were used. Of this amount, 366.39 mg (1.87 mmol) was used in the initial charge, with 1.872 g (9.54 mmol) in the monomer feed.

Solid resin analyses:
Solids content (SC): 48.7% (methanolic solution); pure solid resin: viscosity (Höppler, 10% in ethyl acetate) 2.37 mPas; acid number AN (methanol) 10.09 mg KOH/g; Mw (from GPC, mobile phase THF; polystyrene standards): 32,700 g/mol; Mn: 13,500 g/mol; dispersity Mw/Mn: 2.42; silicon content: 0.113% (alkaline digestion).

Evaluation:
Comparative Example 6 leads to a lower molecular weight than Example 5. The mercapto compound is a very strong regulator. The silane aldehyde exhibits a milder regulator effect, although two free aldehyde groups are transferred in the compound.

EXAMPLE 7

A 2-liter stirred tank with reflux condenser, metering apparatus, thermostatable jacket and an anchor stirrer was charged with 424.61 g of methanol, 72.81 g of vinyl acetate (Vac), 766.44 mg of VeoVa10, 3.10 g of isopropenyl acetate (IPAc, in 99% form), 766.44 mg (3.11 mmol) of 1,1'-di(ethylformyl)tetramethyldisiloxane and 345.59 mg of PPV (tert-butyl perpivalate -75% in aliphatics; half-life=1 h at 74° C.). The tank was heated to 60° C. When gentle reflux was attained the metering of initiator began (4.95 g of PPV and 46.45 g of methanol). For the first hour the initiator was metered in at 6 ml/h. After 1 hour of incipient polymerization the monomer feed then began (368.47 g of VAc, 3.88 g of VeoVa10, 15.67 g of IPAc (in 99% form) and 3.88 g (15.76 mmol) of 1,1'-di(ethylformyl)tetramethyldisiloxane) over a time of 240 minutes (rate: 106 ml/h). At the same time the initiator feed was raised to 12 ml/h. The initiator feed ran at this rate for 240 minutes and ended with the monomer feed. Following the initiator feed the batch ran at temperature for another 120 minutes. After this post-reaction time the tank was heated for distillation, in the course of which fresh methanol was placed in the tank every 30 minutes for 6 h, corresponding to the amount removed by distillation (demonomerization).

Solid resin analyses:
Solids content (SC): 47.61% (methanolic solution); pure solid resin: viscosity (Höppler, 10% in ethyl acetate) 2.26 mPas; acid number AN (methanol) 3.93 mg KOH/g; Mw (from GPC, mobile phase THF; polystyrene standards): 28,000 g/mol; Mn: 11,500 g/mol; dispersity Mw/Mn: 2.43; silicon content: 0.155% (alkaline digestion); Si content from $^1$H NMR: 0.172%

COMPARATIVE EXAMPLE 8

As Example 7 with the difference that instead of the silane-containing aldehyde 1,1'-di(ethylformyl)tetramethyl-disiloxane 3.703 g (18.87 mmol) of 3-mercaptopropyltri-methoxysilane were used. Of this amount, 611.59 mg (3.12 mmol) was used in the initial charge, with 3.091 g (15.75 mmol) in the monomer feed.

Solid resin analyses:
Solids content (SC): 44.58% (methanolic solution); pure solid resin: viscosity (Höppler, 10% in ethyl acetate) 1.98 mPas; acid number AN (methanol) 3.37mg KOH/g; Mw (from GPC, mobile phase THF; polystyrene standards): 24,300 g/mol; Mn: 9,800 g/mol; dispersity Mw/Mn: 2.48; silicon content: 0.102% (alkaline digestion).

EXAMPLE 9

A 2-liter stirred tank with reflux condenser, metering apparatus, thermostatable jacket and an anchor stirrer was charged with 268.78 g of ethyl acetate, 121.83 g of vinyl acetate (VAc), 1.22 g (4.15 mmol) of 3,3-diethoxypropyl-triethoxysilane and 549.33 mg of PPV (tert-butyl perpiv-alate–75% in aliphatics; half-life=1 h at 74° C.). The tank was heated to 60° C. When gentle reflux was attained the metering of initiator began (7.88 g of PPV and 51.49 g of ethyl acetate). For the first hour the initiator was metered in at 5 ml/h. After 1 hour of incipient polymerization the monomer feed then began (616.52 g of VAc and 6.17 g (20.98 mmol) of 3,3-diethoxypropyltriethoxysilane) over a time of 240 minutes (rate: 167.4 ml/h). At the same time the initiator feed was raised to 10.5 ml/h. The initiator feed ran at this rate for 300 minutes and ended 1 h after the monomer feed. Following the initiator feed the batch ran at temperature for another 120 minutes. After this post-reaction time the tank was heated for distillation, in the course of which fresh methanol was placed in the tank every 30 minutes for 6 h, corresponding to the amount removed by distillation (demonomerization).

Solid resin analyses:
Solids content (SC): 61.90% (methanolic solution); pure solid resin: viscosity (Höppler, 10% in ethyl acetate) 11.11 mPas; acid number AN (methanol) 5.61 mg KOH/g; Mw (from GPC, mobile phase THF; polystyrene standards): 188,600 g/mol; Mn: 43,500 g/mol; dispersity Mw/Mn: 4.33; silicon content: 0.084% (alkaline digestion).

COMPARATIVE EXAMPLE 10

As Example 9 with the difference that instead of the full acetal of the silane-containing aldehyde, 3,3-diethoxypro-pyltriethoxysilane, 4.943 g (25.19 mmol) of 3-mercaptopro-pyltrimethoxysilane were used. Of this amount, 814.57 mg (4.15 mmol) was used in the initial charge, with 4.128 g (21.04 mmol) in the monomer feed.

Solid resin analyses: Solids content (SC): 62.02% (methanolic solution); pure solid resin: viscosity (Höppler, 10% in ethyl acetate) 4.42 mPas; acid number AN (methanol) 5.05 mg KOH/g; Mw (from GPC, mobile phase THF; polystyrene standards): 69,000 g/mol; Mn: 26,000 g/mol; dispersity Mw/Mn: 2.60; silicon content: 0.076% (alkaline digestion).

Tabular summary:

| Ex. | Regulator type (amount, mmol) | Transfer (%)[1] | Mw | Mn | Dispersity | Si content (%)[2] |
|---|---|---|---|---|---|---|
| 1 | V (15.95) | 70 | 31,000 | 12,000 | 2.54 | 0.119 |
| 2 | I (15.95) | 94 | 38,000 | 14,000 | 2.71 | 0.075 |
| 3 | I (15.95) | 96 | 37,500 | 13,700 | 2.74 | 0.082 |
| C4 | SH-silane (15.95) | 100 | 26,400 | 11,400 | 2.32 | 0.081 |
| 5 | V (11.40) | 86 | 36,500 | 15,500 | 2.35 | 0.153 |
| C6 | SH-silane (11.41) | 100 | 32,700 | 13,500 | 2.42 | 0.113 |
| 7 | V (18.87) | 91 | 28,000 | 11,500 | 2.43 | 0.155 |
| C8 | SH-silane (18.87) | 100 | 24,300 | 9800 | 2.48 | 0.102 |
| 9 | II (25.13) | 20 | 188,600 | 43,500 | 4.33 | 0.084 |
| C10 | SH-silane (25.19) | 100 | 69,000 | 26,500 | 2.6 | 0.076 |

[1] The transfer of the regulator was determined by means of $^1$H NMR spectroscopy.
[2] The silicon content was determined by alkaline digestion.

What is claimed is:

1. A silane-containing polymer prepared by free-radical addition polymerization of one or more ethylenically unsaturated monomers in the presence of silane-containing aldehydes, silane-containing hemiacetals, silane-containing acetals, or mixtures thereof, wherein the silane-containing aldehydes, hemiacetals, and acetals are selected from the group consisting of compounds of the structural formulae

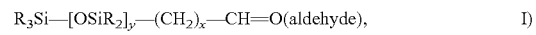

$$R_3Si-[OSiR_2]_y-(CH_2)_x-CH=O \text{(aldehyde)}, \qquad I)$$

$$R_3Si-[OSiR_2]_y-(CH_2)_x-CH(OR^1)_2 \text{((hemi)acetal)}, \qquad II)$$

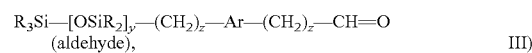

$$R_3Si-[OSiR_2]_y-(CH_2)_z-Ar-(CH_2)_z-CH=O \text{(aldehyde)}, \qquad III)$$

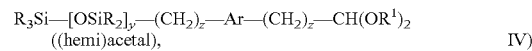

$$R_3Si-[OSiR_2]_y-(CH_2)_z-Ar-(CH_2)_z-CH(OR^1)_2 \text{((hemi)acetal)}, \qquad IV)$$

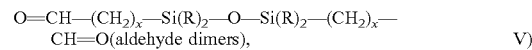

$$O=CH-(CH_2)_x-Si(R)_2-O-Si(R)_2-(CH_2)_x-CH=O \text{(aldehyde dimers)}, \qquad V)$$

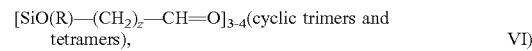

$$[SiO(R)-(CH_2)_z-CH=O]_{3-4} \text{(cyclic trimers and tetramers)}, \qquad VI)$$

where R is identical or different at each occurrence and is halogen: an unbranched or branched, saturated or unsaturated, optionally substituted alkyl or alkoxy radical having 1 to 12 carbon atoms; an acyl radical having 2 to 12 carbon atoms; or an optionally substituted aryl or aryloxy radical having 3 to 20 carbon atoms, R optionally interrupted by one or more non-adjacent heteroatoms selected from the group consisting of N, O and S, and the aryl radical or the aryl group of the aryloxy radical optionally containing one or more heteroatoms selected from the group consisting of N, O and S, and $R^1$ is H, an unbranched or branched, saturated or unsaturated, optionally substituted alkyl radical having 1 to 12 carbon atoms, the carbon atoms of which are optionally interrupted one or more non-adjacent heteroatoms selected from the group consisting of N, O and S, Ar is an aromatic group, optionally containing one or more heteroatoms selected from the group consisting of N, O and S, and x is a number from 2 to 40, y is a number from 0 to 100, and z is a number from 0 to 20, wherein the silane-containing aldehyde, silane-containing hemiacetal, or silane-containing acetal is employed as a chain regulator in an amount of 0.0001 to 5.0% by weight based on the total weight of all monomers, and wherein the free radical polymerization is initiated by a non-redox free radical initiator, or when the initiator is a redox initiator, the oxidizing agent is selected from the group consisting of sodium, potassium, and ammonium salts of peroxodisulfuric acid, hydrogen peroxide, t-butyl peroxide, potassium peroxodiphosphate, t-butyl peroxopivalate, cumene hydroperoxide, isopropylbenzene monohydroperoxide, azobisisobutyronitrile, dicetyl peroxydicarbonate, dicyclohexylperoxydicarbonate, dibenzoyl peroxide, t-butyl perneodecanoate, t-butyl per-2-ethylhexanoate, t-butylperipalate, and mixtures thereof.

2. The silane-containing polymer of claim 1, wherein the ethylenically unsaturated monomers comprise one or more monomers selected from the group consisting of vinyl esters of unbranched and branched alkylcarboxylic acids having 1 to 18 carbon atoms; acrylic esters and methacrylic esters of branched and unbranched alcohols and diols having 1 to 18 carbon atoms; ethylenically unsaturated monocarboxylic and dicarboxylic acids, their amides, N-methylolamides and nitriles; ethylenically unsaturated sulfonic acids; ethylenically unsaturated heterocyclic compounds; alkyl vinyl ethers; dienes; olefins; vinylaromatics; and vinyl halides.

3. The silane-containing polymer of claim 1, wherein ethylenically unsaturated, silane-containing monomers are copolymerized as one of said one or more ethylenically unsaturated monomers.

4. The silane-containing polymer of claim 1, wherein ethylenically unsaturated, silane-containing monomers are copolymerized as one of said one or more ethylenically unsaturated monomers.

5. A process for preparing a silane-containing polymer of claim 1, by free-radical addition polymerizing one or more ethylenically unsaturated monomers in the presence of at least one silane-containing aldehyde, silane-containing hemiacetal, silane-containing acetal, or mixture thereof.

6. The process of claim 5, wherein polymerizing takes place in bulk, in solution, in suspension or in emulsion.

7. The process of claim 5, wherein a portion of the silane-containing aldehydes, silane-containing hemiacetals and/or silane-containing acetals are included in the initial charge and the remainder is metered in.

8. The process of claim 5, wherein silane-containing compounds other than silane-containing aldehydes, hemiacetals, or acetals, or aldehydes are also employed as further regulators.

9. In a release coating wherein a silane-containing polymer is employed as at least one component, the improvement comprising selecting as said silane-containing polymer, a silane-containing polymer of claim 1.

10. In an architectural preservative composition wherein a silane-containing polymer is employed as at least one component, the improvement comprising selecting as a silane-containing polymer, a silane-containing polymer of claim 1.

11. In a modifier or water repellent composition wherein a silane-containing polymer is employed as at least one component, the improvement comprising selecting as a silane-containing polymer, a silane-containing polymer of claim 1.

12. In a binder in an adhesive, paint, printing ink or sealant composition wherein a silane-containing polymer is employed as at least one component, the improvement comprising selecting as a silane-containing polymer, a silane-containing polymer of claim 1.

13. In a hydraulically setting construction product selected from the group consisting of construction adhesives, renders, filling compounds, trowel-applied flooring compounds, leveling compounds, non-shrink grouts, joining mortars and paints containing at least one hydraulically setting binder selected from the group consisting of cement, gypsum, and waterglass, wherein a polymer additive is employed, the improvement comprising selecting as at least one polymer additive, silane-containing polymer of claim 1.

14. In a binder for coating materials and adhesives or as coating material or binder for textiles, fibers, wood or paper compositions wherein a silane-containing polymer is employed as at least one component, the improvement comprising selecting as a silane-containing polymer, a silane-containing polymer of claim 1.

15. The silane-containing polymer of claim 1, wherein the silane-containing aldehyde, silane-containing hemiacetal, or silane-containing acetal is employed in an amount of from 0.1 to 3.0 weight percent based on the weight of all monomers.

16. The silane-containing polymer of claim 1, wherein the chain regulator consists of a silane-containing hemiacetal.

17. The silane-containing polymer of claim 1, wherein the chain regulator consists of a silane-containing acetal.

18. The silane-containing polymer of claim 1, wherein a silane-containing aldehyde, hemiacetal, or acetal is selected from the group consisting of 3,3-diethoxypropyltriethoxysilane, 3,3-dimethoxypropyltriethoxysilane, 3,3-diethoxypropyl-trimethoxysilane, 3,3-dimethoxypropyl-trimethoxysilane, 3,3-diethoxypropylmethyldiethoxy-silane, 3,3-dimethoxypropyldiisopropoxymethylsilane, 3,3-diethoxypropyldimethylethoxy-silane, 3,3-dimethoxypropyldiisopropoxymethylsilane, 3,3-dimethoxypropyltripropoxysilane, 3,3-dimethoxypropyltriisopropoxysilane, 3,3-dipropoxypropyltriethoxysilane, 3,3-diethoxypropylmethyldimethoxysilane, 3,3-diethoxypropyldimethylmethoxysilane, 3,3-dimethoxypropymethyldimethoxysilane, 3,3-dimethoxypropyldimethylmethoxysilane, 3,3-dimethoxyprolmethldimethoxysilane, 1,1'-diethylformyltetramethyldisiloxane, and mixtures thereof.

* * * * *

UNITED STATES PATENT AND TRADEMARK OFFICE
CERTIFICATE OF CORRECTION

PATENT NO. : 7,309,746 B2  
APPLICATION NO. : 10/513242  
DATED : December 18, 2007  
INVENTOR(S) : Andreas Bacher et al.

It is certified that error appears in the above-identified patent and that said Letters Patent is hereby corrected as shown below:

Column 14, Line 54, Claim 18:

Delete "dimethoxypropymethyldimethoxysilane" and insert:

-- dimethoxypropylmethyldimethoxysilane --,

Column 14, Line 56, Claim 18:

Delete "dimethoxyprolmethyldiethoxysilane" and insert:

-- dimethoxypropylmethyldiethoxysilane --,

Signed and Sealed this

Twenty-fourth Day of June, 2008

JON W. DUDAS  
*Director of the United States Patent and Trademark Office*